United States Patent
Damodaran et al.

(10) Patent No.: US 7,900,153 B2
(45) Date of Patent: Mar. 1, 2011

(54) SUPPLY CHAIN VISUALIZATION AND MANAGEMENT SYSTEM WITH DYNAMIC ZOOMING

(75) Inventors: Suresh K. Damodaran, Acton, MA (US); Todd L. Margo, Dallas, TX (US)

(73) Assignee: Sterling Commerce, Inc., Dublin, OH (US)

( * ) Notice: Subject to any disclaimer, the term of this patent is extended or adjusted under 35 U.S.C. 154(b) by 732 days.

(21) Appl. No.: 11/764,669

(22) Filed: Jun. 18, 2007

(65) Prior Publication Data

US 2008/0312987 A1 Dec. 18, 2008

(51) Int. Cl.
G06F 3/048 (2006.01)
G06F 17/00 (2006.01)
G06F 9/44 (2006.01)

(52) U.S. Cl. .................. 715/764; 715/810; 715/200; 705/7

(58) Field of Classification Search .......... 715/764, 715/810, 200; 705/7
See application file for complete search history.

(56) References Cited

U.S. PATENT DOCUMENTS

| | | | |
|---|---|---|---|
| 6,486,899 B1 | 11/2002 | Bush, Jr. | |
| 6,577,304 B1 | 6/2003 | Yablonski et al. | |
| 6,823,495 B1 | 11/2004 | Vedula et al. | |
| 6,947,905 B1 | 9/2005 | Starr et al. | |
| 7,107,285 B2 | 9/2006 | von Kaenel et al. | |
| 2004/0054428 A1* | 3/2004 | Sheha et al. | 700/56 |
| 2006/0022841 A1* | 2/2006 | Hoiness et al. | 340/870.02 |
| 2006/0197781 A1* | 9/2006 | Arutunian | 345/629 |
| 2008/0071592 A1* | 3/2008 | Day et al. | 705/7 |

* cited by examiner

Primary Examiner — Ting Lee
(74) Attorney, Agent, or Firm — Jackson Walker L.L.P.

(57) ABSTRACT

Supply chain visualization and management are achieved using supply entity icons and inventory parameters overlaid on a zoomable map image. A user zooms in and zooms out to display multiple geographical areas and variably receives greater or less detail regarding supply parameters. A user may initiate a transfer of products between supply entities by manipulating icons on an output device to result in the generation and sending of business documents to relevant entities. A hypothetical mode allows a user to estimate the effects of potential product transfers on entities within the supply chain.

14 Claims, 6 Drawing Sheets

SUPPLY CHAIN VISUALIZATION AND MANAGEMENT SYSTEM WITH DYNAMIC ZOOMING

FIELD OF THE DISCLOSURE

The present disclosure relates to supply chain visualization and management systems.

BACKGROUND OF THE DISCLOSURE

Supply chain visualization and management systems are used to view and control various parameters in a supply chain. Large enterprises often have supply chain entities spread across a large geographic region. A system for visualizing such supply chains may have too much information to present on a single display. Therefore, systems are needed to provide users with manageable amounts of graphical supply chain information.

DETAILED DESCRIPTION OF THE DRAWINGS

Figure 1:
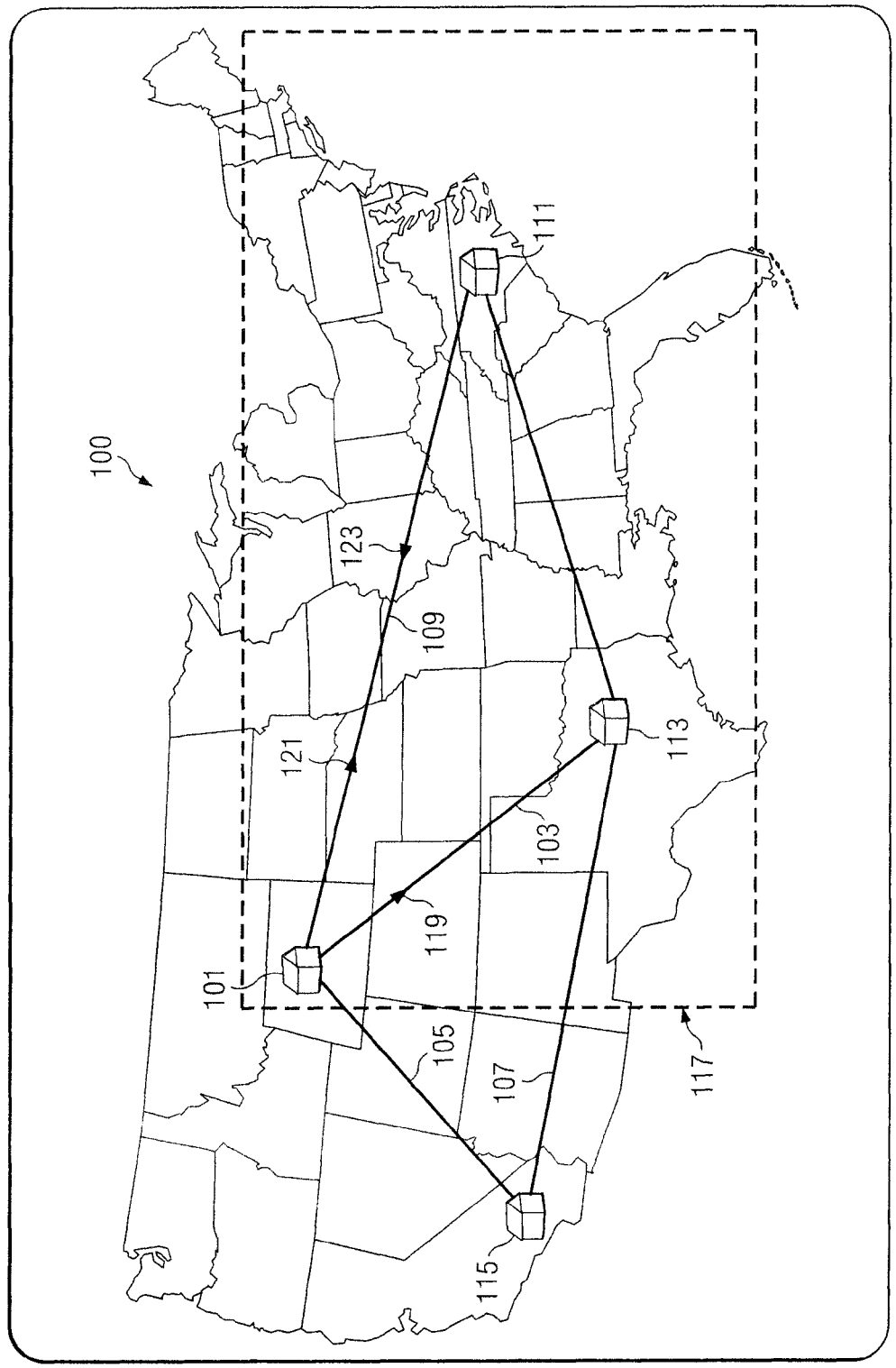
FIG. 1 illustrates a first zoom level of a supply chain visualization and management system, in which a plurality of supply entity icons are superimposed on a zoomable map image.

In one aspect, a system for visually representing a supply chain is disclosed. A first supply chain image is superimposed on a computer-related zoomable map image. The first supply chain image represents a supply chain at a first zoom level. The first zoom level represents a first geographical region. The first zoom level includes a connector icon positioned between a first supply entity icon and a second supply entity icon. The connector icon represents a route for product flow between first and second supply entities. The system includes an input device for selecting a second zoom level of the computer-related zoomable map image. The second supply image is superimposed on the second zoom level. The second zoom level represents a second geographical region within the first geographical region. The second supply chain image includes a first supply parameter icon relating to the first supply entity and a second supply parameter icon relating to the second supply entity. The second supply chain image further includes a first graphical supply indicator corresponding to a first supply quantity of the first supply entity and a second graphical supply indicator corresponding to a second supply quantity of the second supply entity.

In another aspect, a computer-readable medium having computer-readable program code is disclosed. The computer-readable program code provides an overlay engine. The overlay engine is for superimposing a plurality of icons on one or more zoom levels of the zoomable map image. Each of the plurality of icons has a location on the one or more zoom levels determined by accessing a corresponding physical location from a database. The computer-readable program code provides a business document generator for generating a first business document in response to a transfer request. The computer-readable program code provides a zoom engine responsive to a first selection input indicating the bounds of a second zoom level. The first selection input occurs while a first zoom level is displayed on an output device. The first zoom level corresponds to a first geographical area and the second zoom level corresponds to a second geographical area. The first zoom level provides a first amount of detail and the second zoom level provides a second amount of detail. The computer-readable program code provides a hypothetical-mode engine responsive to a user request to perform a hypothetical -mode transfer request. The hypothetical-mode engine is for displaying one or more anticipated effects of the hypothetical-mode transfer request on the output device.

In still another aspect, a method for visualizing and managing a supply chain is disclosed. The method includes displaying a first composite image on an output device. The first composite image includes a plurality of supply entity icons superimposed on a first zoom level of a zoomable map image. The first composite image corresponds to a first geographical region. The method includes displaying on the output device a second composite image. The second composite image includes a first portion of the plurality of supply entity icons superimposed on a second zoom level of the zoomable map image. The second composite image corresponds to a second geographical region. The second zoom level is defined by first user inputs received from a user during display of the first composite image. The second composite image includes a first plurality of supply parameter icons. A portion of the first plurality of supply parameter icons relates to one or more of a first plurality of physical supply entities corresponding to the first portion of the plurality of supply entity icons.

Referring to FIG. 1, aspects of an embodiment are shown in which a first zoom level 100 depicts a first geographical region. As shown, the first geographical region includes 48 states in the United States of America. However, in embodiments the first zoom level 100 could be geographically more or less inclusive, such as by including the entire Earth, a single hemisphere, a particular continent, a state, a county, a city or just a single campus, for example. In some embodiments, the first geographical region is represented in zoom levels as a photographed satellite image and alternatively, using solid-colored computer graphics. In some embodiments, the first geographical region is overlaid upon a weather map, allowing a user to anticipate how various supply entities might be affected by weather systems.

Still referring to FIG. 1, first zoom level 100 includes graphical representations of a plurality of supply entities in a supply chain. As shown, manufacturing sites in the supply chain are represented by a plurality of supply entity icons, for example icon 115, icon 113, icon 111, and icon 101. Although these supply entity icons illustrated in FIG. 1 are described as representing manufacturing sites, these icons or similar icons could represent other entities in a supply chain, for example, retail outlets, ports, assembly areas, service centers and warehouses.

As shown in FIG. 1, icon 113 and icon 115 are associated with connector icon 107. Connector icon 107 represents product flow between the manufacturing site represented by icon 115 and the manufacturing site represented by icon 113. Similarly, icon 115 and icon 101 are associated with connector icon 105, which represents product flow between the manufacturing site represented by icon 115 and the manufacturing site represented by icon 101.

Also depicted in FIG. 1 within the first zoom level 100, is an optional selection box 117. Selection box 117 represents an area to be viewed at a second zoom level, which in some embodiments contains details not shown in the first zoom level 100. Selection box 117 is defined, for example, by a user clicking and dragging a mouse pointer on a first corner of selection box 117 and deselecting a mouse pointer at a second corner of selection box 117. Upon such user inputs, the second zoom level depicted in FIG. 2 is displayed on an output device such as a computer monitor.

Figure 2:
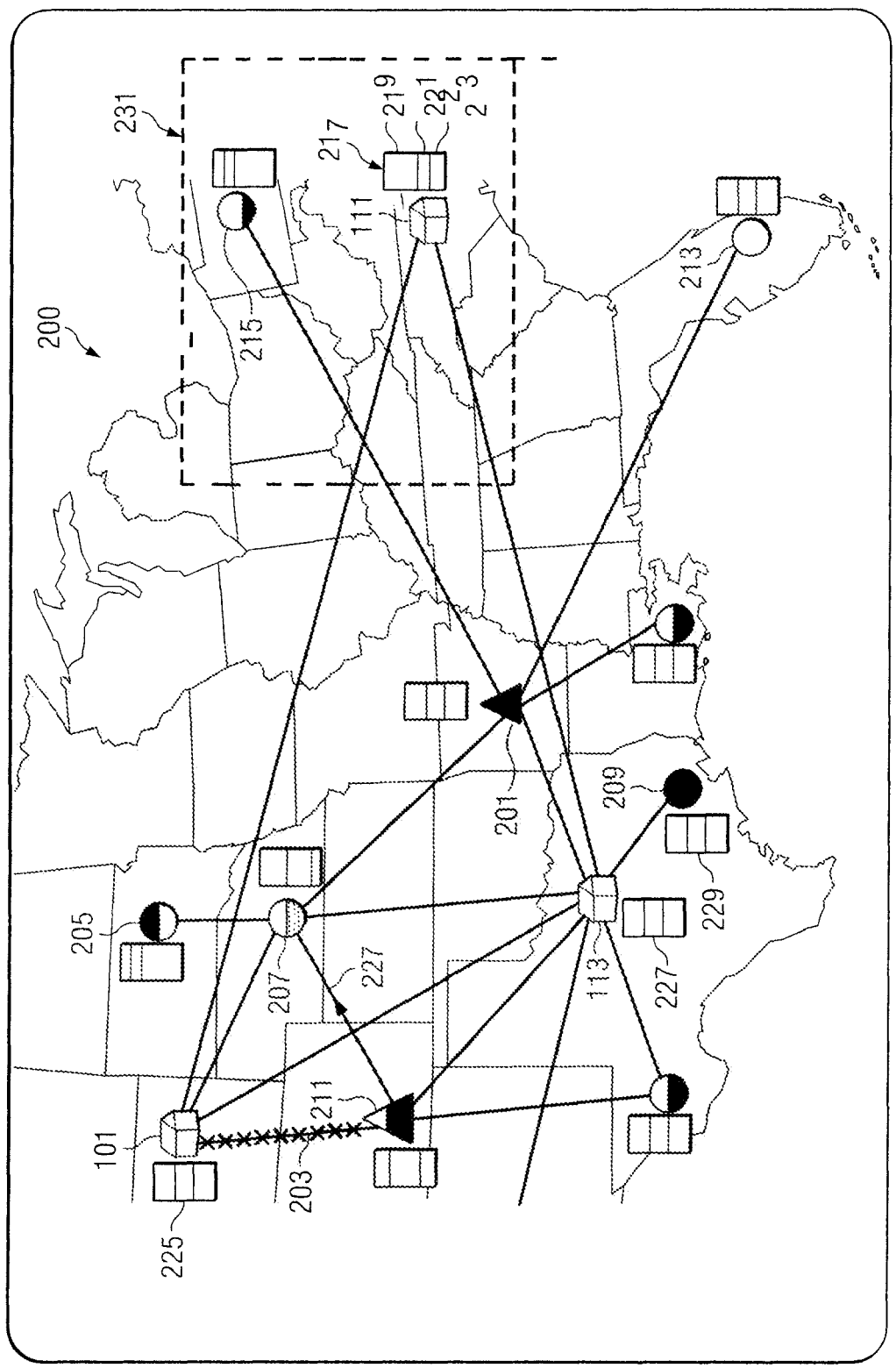
FIG. 2 illustrates a second zoom level, in which a portion of the supply entity icons from FIG. 1 are shown in more detail, including the display of various supply parameters associated with the supply entity icons.

FIG. 2 depicts a second zoom level 200 corresponding to the second geographical region bounded by the selection box 117 (FIG. 1), for example. User inputs other than mouse operations can be used for selecting the second geographic region for displaying at the second zoom level. Further, the second zoom level may represent a smaller geographical area than the first geographical area. As shown, second zoom level 200 includes aspects of the supply chain not shown in first zoom level 100 (FIG. 1). For example, a supply parameter icon 217 is associated with the manufacturing site represented by icon 111. Similarly, a supply parameter icon 225 is associated with icon 101, and supply parameter icon 227 is associated with icon 113. As shown, each of the supply parameter icons are divided into three subparts, with each subpart providing a graphical representation regarding one or more aspects of the inventory of the underlying manufacturing site. For example, supply parameter icon 217 includes subpart parameter 219, subpart parameter 221, and subpart parameter 223. In some embodied systems, these subpart parameters are varied in size and color to provide the user information related to the underlying manufacturing site or other supply entity associated with the supply entity icon.

By way of example, an embodied supply chain visualization and management system uses icon 111 to represent a manufacturing site for producing T-shirts. Accordingly, the first zoom level 100 (FIG. 1) and the second zoom level 200 (FIG. 2) illustrate the supply chain for distributing the T-shirts. As shown, supply parameter icon 217 is divided into subpart 219, subpart 221, and subpart 223. In an embodiment, subpart 219 is associated with extra-large T-shirts, subpart 221 is associated with large T-shirts, and subpart 223 is associated with medium T-shirts. To provide a graphical indication of the ratio of extra-large T-shirts to medium T-shirts, subpart 219 is sized appropriately relative to subpart 223. Likewise, subpart 221, which is associated with large T-shirts, is sized relative to subparts 223 and 219 to provide a graphical indication regarding the ratio of large T-shirts to extra-large and medium T-shirts. In this way, supply parameter icon 217 (FIG. 2) provides aspects regarding the supply chain visualization and management system not provided in the first zoom level 100 (FIG. 1). Supply parameter icon 217 can be characterized as a "first category icon" or a "graphical supply indicator" because it provides information regarding categories of a supply or inventory for the manufacturing site represented by icon 111. In a similar way, supply parameter icon 227 can be categorized as a "second category icon" that provides information regarding an inventory associated with supply entity icon 113. In some embodiments, subparts of supply parameter icon 217 and supply parameter icon 227 are displayed in varying sizes and colors to provide a plurality of cues or indicators regarding individual components of the inventory. For example, referring to supply parameter icon 217, in some embodiments subpart 219 is illuminated in red if the level of inventory of extra-large T-shirts falls below a predetermined or threshold value.

Using T-shirts in the above example is intended as illustrative and not restrictive. Further, examples regarding supply parameter icons are meant as illustrative and not restrictive. In embodied systems, other supply chain parameters can be associated with these and other icons. For example, the supply parameter icon 217 and other such icons may be associated with average days of inventory for a specific class of perishable products such as baby food for a geographic region. Accordingly, a user viewing subpart icons 219, 221, and 223 may be presented information regarding the average amount of time items had been in a warehouse or manufacturing facility, for example. A user could then use the data to initiate transfers of the oldest inventory to retail outlets, for example, in first in first out scheme. In other embodiments, the icons could be associated with consumption data of certain goods or services, to provide a user comparative data within a geographic region of the demand for the goods or services.

Similarly, the illustrated size, location, and appearance of the icons in zoom level 100 (FIG. 1) and zoom level 200 (FIG. 2) are meant as instructive and not restrictive. Further, first zoom level 100 and second zoom level 200 may not display all aspects of some embodiments. For example, as an aspect of some embodiments, supply entity icons, supply parameter icons, subpart icons, and other such icons are dynamically adjusted to vary any callout information, color-based indicators, text-based indicators, or other displayed supply parameters. In addition, some embodiments alter the display of these icons and their associated information based on a zoom level chosen by a user. Such systems that vary the amount, class, or type of information provided based on zoom level may be beneficial compared to other supply chain visualization and management systems that only supply fixed, textual "callout" information when a user clicks on an icon, with no defined method for adjusting the content of the text displayed based on the map's zoom level.

In some embodiments, additional graphical indicators or icons provide visual representations of various business rules or other constraints on certain actions. For example, a business rule may specify that inventory can be moved only in full truck loads. Graphical indicators can be added to the displayed supply chain to represent this and other rules. Other graphical indicators can be added to allow such constraints to be modified or overruled, perhaps based on the authority level of the user. Accordingly, various embodiments may include graphical indicators that allow changes to various business rules.

Referring to FIG. 2, second zoom level 200 includes other information that is additional to information provided in first zoom level 100 (FIG. 1). For example, second zoom level 200 includes icon 207, which has a circular shape and icon 211, which has a triangular shape. In an embodiment, a circular icon represents a retail outlet and a triangular icon represents a warehouse. As shown, icon 207 and icon 211 are joined by a connector icon 227, which represents a supply path between the retail outlet associated with icon 207 and the warehouse associated with icon 211.

As a further aspect of the second zoom level 200 in FIG. 2, icon 211 has a solid-shaded bottom portion and an un-shaded top portion. In some embodiments, the ratio of the solid-shaded bottom portion to the un-shaded top portion in icon 211 is varied to indicate the capacity for the warehouse associated with icon 211 to receive additional inventory. The shaded portion in icon 211 is a graphical (i.e., non-textual) supply indicator for displaying a percentage of storage space that is occupied in the warehouse associated with icon 211. Similarly, as shown, icon 207 has a shaded portion which is a graphical supply indicator representing the percentage of storage space available at the retail outlet associated with icon 207. The ratio of the shaded to un-shaded portions in icon 207 is varied to provide an indication of the ability of the retail outlet associated with icon 207 to receive further inventory.

As shown, another aspect of second zoom level 200 is that icon 205 contains a top-shaded portion and a bottom, un-shaded portion. In some embodiments, a top-shaded portion is an indication that the retail outlet associated with icon 205 is overstocked and has inventory to provide to other retail outlets, as necessary. Accordingly, icons such as icon 207, icon 205, and icon 211 are varied to signal inventory levels based on retail space available, warehouse space available, or other factors. For example, in some embodiments, the shaded portions are adjusted based on predicted sales, which may be based on past sales. Alternatively, the size of shaded portions is influenced by weather predictions. For example, if a hurricane were forecast to hit Florida and a retail outlet associated with icon 213 were expected to need certain inventory, icon 213 may automatically be adjusted as shown to have no bottom-shaded portion. In this way, the shaded portions of icons such as icon 211, icon 209, icon 207, icon 205, icon 215, and icon 213 are adjusted based on weather, predictive algorithms, current inventory levels, or other such factors.

Another aspect of second zoom level 200 illustrated in FIG. 2 relates to a connector icon 203. As shown, connector icon 203 contains a graphical indication, shown in the form of several "X" marks, that denotes that the underlying supply route is obstructed between the manufacturing site associated with icon 101 and the warehouse associated with icon 211.

As another aspect of FIG. 2, second zoom level 200 illustrates icon 209 having a supply parameter icon 229 associated with it. Supply parameter icon 229, analogous to supply parameter 217, may provide an indication as to the ratios between separate parts of the inventory associated with the retail outlet depicted by icon 209. Similarly, icon 211, icon 201, icon 207, and icon 215 each have associated with them supply parameter icons that indicate the ratios between distinctive parts of their respective inventories, for example. Through these aspects and other aspects that may not be shown in FIG. 1 or FIG. 2, second zoom level 200 provides information not provided in first zoom level 100 (FIG. 1).

Referring to FIG. 2, second zoom level 200 illustrates an optional selection box 231. In an embodiment, selection box 231 is generated by a user in a way similar to the generation of selection box 117 (FIG. 1). Specifically, a user clicks a mouse button with a cursor on a display device located at one corner of selection box 231. The user then drags the cursor to an opposite corner of selection box 231. In this way, a user selects a geographical area for display at a third zoom level, shown as zoom level 300 in FIG. 3.

The disclosure herein of selection box 117 (FIG. 1) and selection box 231 (FIG. 2) is meant to be illustrative and not restrictive. In some embodiments, zoom levels on a display can be achieved using "zoom bars" that may be associated with third-party, zoomable map images. Alternatively, some embodiments are enabled to provide a selection box with a circular shape rather than a rectangular shape. These "selection circles" may be defined, for example, by a user clicking a mouse button at the selection circle center and dragging to the radius of the selection circle. In alternative embodiments, first zoom level 100, second zoom level 200, and third zoom level 300 are chosen not by selection boxes, but by clicking icons associated with pre-defined geographical areas such as counties, states, sales regions, or the like.

Figure 3:
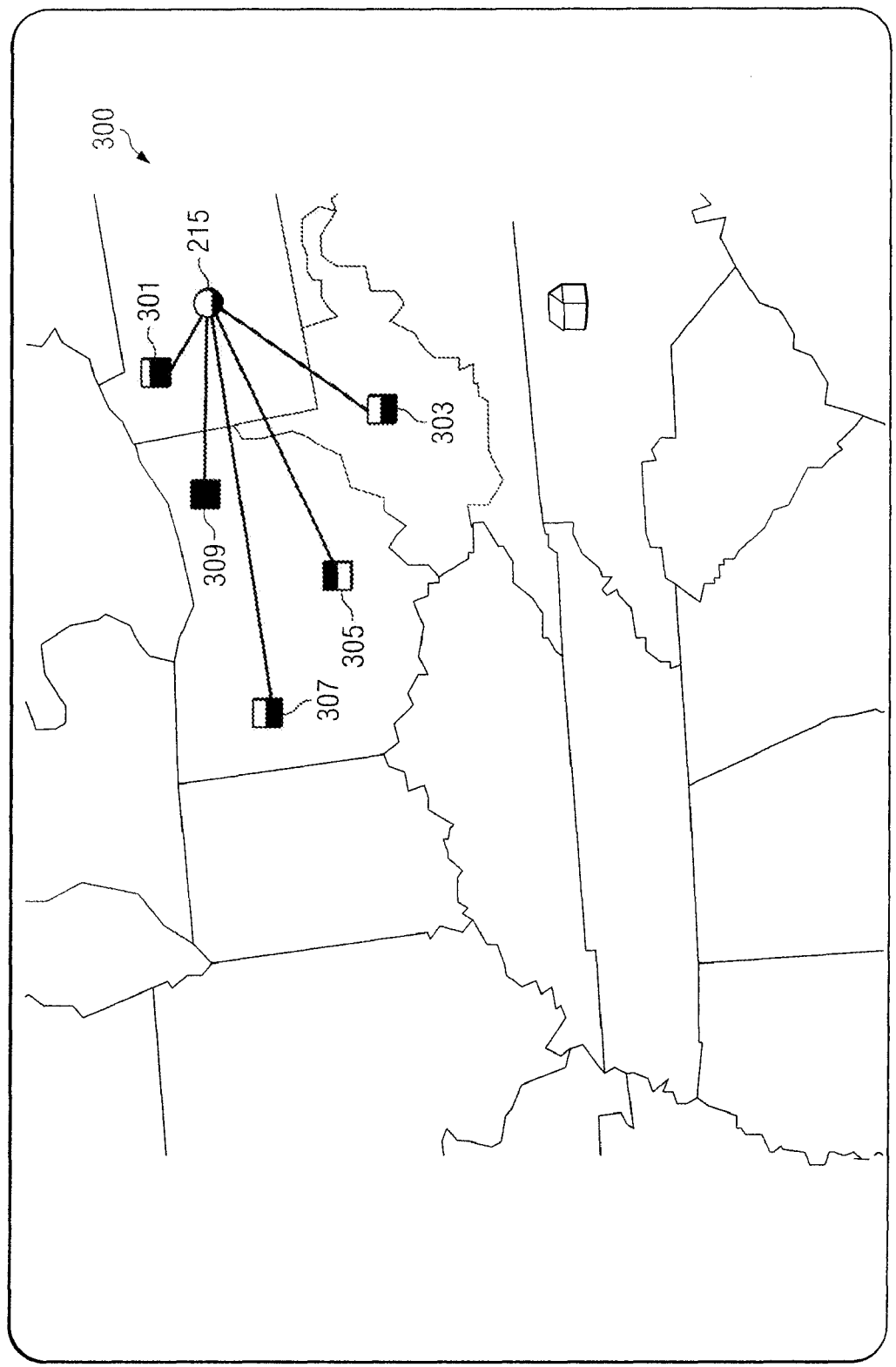
FIG. 3 illustrates a third zoom level, in which additional details regarding certain supply parameters are provided for a portion of the supply entity icons and supply parameters from FIG. 2.

FIG. 3 illustrates a third zoom level 300 of the supply chain illustrated in FIG. 1 and FIG. 2. Specifically, third zoom level 300 shows in greater detail the geographical region bounded by selection box 231 (FIG. 2). Similar to FIG. 2, FIG. 3 illustrates icon 215, which in an embodiment represents a retail outlet, due to its round shape. Also, as discussed above regarding FIG. 2, icon 215 may indicate that the inventory level of the associated retail outlet is relatively low, due to the small shaded portion of icon 215, as compared to its large un-shaded portion. As shown, zoom level 300 provides information not provided in zoom level 200 (FIG. 2). For example, zoom level 300 shows icon 301, icon 309, icon 307, icon 305, and icon 303. In an embodiment, icon 301, icon 309, icon 307, icon 305, and icon 303 represent suppliers or customers of the retail outlet depicted by icon 215. Accordingly, a user viewing third zoom level 300 is provided details regarding customers or suppliers of the retail outlet associated with icon 215. In an embodiment, icons 301, 309, 307, 305, and 303 represent customers of the retail outlet 215. Based on past sales, predictive algorithms may be used to estimate the inventory of retail outlet 215's customers. Accordingly, the supply chain visualization and management system that generates zoom level 300 may use these estimated inventories to adjust the shaded and un-shaded portions of icons 301, 309, 307, 305, and 303 to provide a user an indication of customer inventories. In this way, zoom level 300 may provide the user an indication, of predicted future needs of the retail outlet associated with icon 215.

Figure 4:
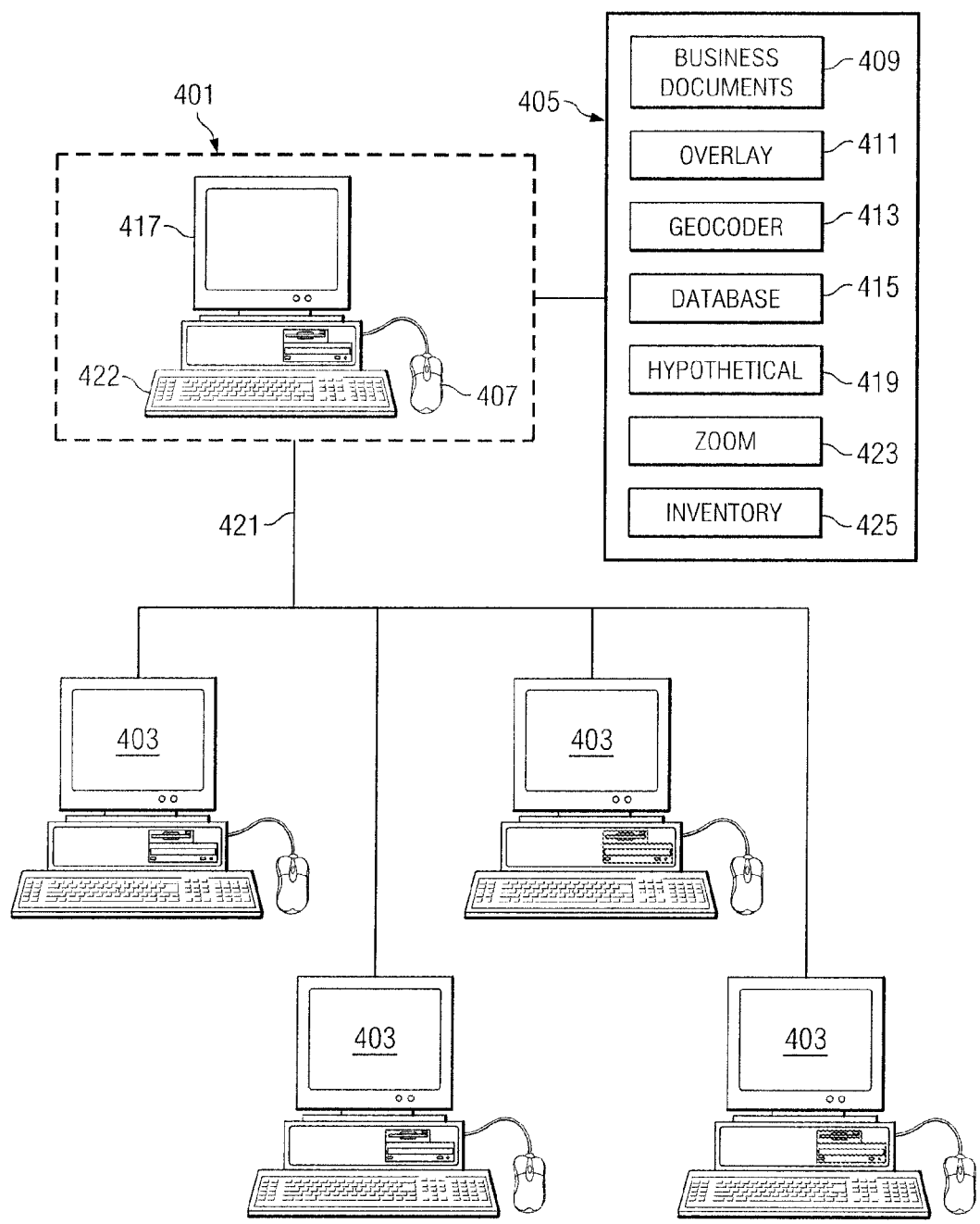
FIG. 4 depicts an embodiment including a data processing system for effecting supply chain visualization and management.

Illustrated in FIG. 4 are elements of an embodied system for visualization and management of a supply chain. As shown, computer 401 includes an output device 417 that may be embodied by a liquid crystal display (LCD), an organic light emitting diode (OLED), a flat panel display, a solid state display, or a cathode ray tube (CRT). Computer 401 includes an input device 407, which may be embodied by a mouse, a roller ball, a joystick, a touch-screen mechanism, or other such input device. Computer 401 includes a keyed input device 422, such as a keyboard. Alternatively, speech recognition technology could be substituted for input device 407 or keyed input device 422.

Computer 401 includes a processing unit 405, for example, a central processing unit (CPU). For clarity, certain aspects of computer 401 may not be shown in FIG. 4. For example, an embodiment of computer 401 may also include a main memory, a static memory, disk drive, and a bus. Computer 401 may also include a disk drive unit and a signal generation device, such as a speaker or remote control. Computer 401 could also include a network interface device (not shown) for interfacing with network 421.

Computer 401, as shown, is coupled through a network 421 to a plurality of computers 403. In an embodiment, the plurality of computers 403 are used by business partners, franchise stores, internal departments, or other entities related to the supply chain being managed and visualized. In a networked deployment, computer 401 may operate in the capacity of a server or a client. Alternatively, computer 401 may serve as a peer computer system in a peer-to-peer (or distributed) network environment. Computer 401 may also be implemented as, or incorporated into, various devices such as a tablet computer, a personal digital assistant (PDA), a mobile device, a palmtop computer, a laptop computer, a desktop computer, a communications device, a wireless telephone, a web appliance, or any other machine capable of executing computer code. Further, while a single computer 401 is illustrated, the term computer is meant to include any collection of systems or sub-systems that individually or jointly execute computer code.

As depicted in FIG. 4, processing unit 405 is operable to execute a plurality of software modules, to accomplish supply chain visualization and management. For example, processing unit 405 is operable to execute overlay engine 411. In some embodiments, overlay engine 411 generates a composite image consisting of a plurality of icons superimposed on a zoomable map image. For example, as illustrated in FIGS. 1 and 2, overlay engine 411 generates icons such as supply entity icon 113 and supply entity icon 101 on a zoomable map image, which may be provided by a third-party supplier of map images. Also, as shown in FIG. 2, overlay engine 411 may generate other supply chain details, for example supply parameter icon 227. In some embodiments, overlay engine 411 accesses a database 415 for determining an address at which to position an entity on a supply chain visualization map. If overlay engine 411 requires coordinates rather than an address for knowing where to locate an icon, a geo-coder 413 may be accessed to convert a known address into coordinates useable by overlay engine 411. For example, geo-coder 413 may access database 415 for an address to convert into longitude and latitude coordinates, which may be required for overlay engine 411 to properly position certain icons onto a computer-related, zoomable map image provided by some third parties. Upon accessing database 413 to obtain a physical address, geo-coder 413 converts the physical address into coordinates consisting of a longitude and latitude. Upon finding the coordinates, overlay engine 411 superimposes icons in the correct position on a zoomable map image, resulting in an image such as first zoom level 100 (FIG. 1), for example.

As another aspect of some embodiments, overlay engine 411 alters the visual representation of an icon or other such marker in order to display a desired amount of detail for a particular zoom level. In other words, overlay engine may vary the display of a supply entity icon or supply parameter icon to provide more or less detail, automatically or as requested by a user, to correspond to a particular zoom level. Such "data zooming," or adjustments to the amount of information provided based on the zoom level, provides supply chain information to a user in manageable amounts, rather than inundating a user with too many details. It also allows users the ability to "drill down" into a supply chain visualization system to obtain information regarding local-level members of a supply chain.

Referring to FIG. 4, processing unit 405 is enabled to provide a business document generator 409. Business document generator 409 is responsive to inputs from a user intended to influence, in real-time, the transfer of goods or services within the supply chain. For example, while viewing a supply chain image such as first zoom level 200 (FIG. 2), a user may drag and drop icons representing inventory to initiate a transfer request. Such transfer requests could be routine or in response to a supply chain logistics crisis, such as a cold spell or hurricane, for example.

By way of example, to initiate a transfer request while viewing zoom level 200 (FIG. 2) on output device 417 (FIG. 4), a user would manipulate input device 407 (FIG. 4) to "click and drag" inventory from supply parameter icon 227 (FIG. 2) to supply parameter icon 217 (FIG. 2). Clicking and dragging occurs, for example, by a user providing directional inputs to input device 407 (FIG. 4), to move a cursor superimposed over the supply chain image. Business document generator 409, in response to the user requesting the transfer of inventory, may request verification or additional information from the user. Upon completion of the request for transfer, business document generator 409 sends relevant documents to the entities involved to effectuate the transfer of goods or services.

In some embodiments, transfer requests may be dealt with differently depending upon the zoom level at which a request is received. For example, if a transfer request is received at a regional zoom level, such as zoom level 200 (FIG. 2), the transfer request may result in sending purchase order requests (i.e., business documents) to several manufacturers, such as those depicted by the supply entity icons of first zoom level 100 (FIG. 1). In this way, the multiple manufacturers depicted by the supply entity icons of first zoom level 100 may submit bids or otherwise provide follow-up documents to express their ability or inability to provide the needed products. Thus, a user initiating a transfer request made at "regional" zoom level may trigger business document generator 409 to send documents requesting quotes or other information from multiple, potential providers within the region.

Referring to FIG. 1 and FIG. 4, a user may initiate a transfer request by providing a plurality of directional inputs to input device 407, causing a cursor superimposed on first zoom level 100 (displayed on output device 417) to appear over a first supply entity icon, such as supply entity 113 (FIG. 1). With the cursor displayed over supply entity icon 113 (FIG. 1), the user provides a selection input for selecting one or more inventory items associated with the first supply entity. For example, the selection input may be the user depressing a mouse button on input device 407. Next, with the inventory that is the subject of the transfer selected, the user moves the cursor over a different icon associated with a proposed destination for the inventory. For example, the user may move the cursor, by providing a plurality of directional inputs to input device 407, to cause the cursor to display on the output device 417 over a second supply entity icon, such as supply entity icon 111 (FIG. 1). The user then provides a de-selection input while the cursor is displayed substantially over the second supply entity icon, such as by releasing a button on input device 407 that was depressed during the "drag and drop" operation.

Accordingly, embodiments provide users the ability to click and drag inventory from one supply entity icon to another supply entity icon, which results in business document generator 409 (FIG. 4) outputting the relevant business documents to all entities involved in the transfer. The first entity and second entity involved in the inventory transfer may be any combination of manufacturers, warehouses, storehouses, or any other entity involved in a supply chain. Business document generator 409 may produce the relevant business documents in various formats, including paper documents, e-mail transmissions, instant message transmissions, facsimile transmissions, or other such methods. Thus, business document generator 409 is responsive to user inputs to input device 407 to initiate real-time transfers of inventory between various entities in a supply chain, such as the supply chain illustrated in first zoom level 100, second zoom level 200, and third zoom level 300 depicted in FIGS. 1-3.

The three zoom levels depicted throughout FIGS. 1-3 are meant as instructive and not limiting. Rather than having only three zoom levels, a supply chain visualization and management system may have countless levels of zoom. Likewise, the amount of information displayed at the multiple zoom levels is not necessarily fixed. Rather, the amount of information may be adjustable, for example based on user preferences. Therefore, in some embodiments, the number of zoom levels is more numerous than three and the amount or type of information displayed may be variable based on user preferences or other parameters. Further, the example embodiments described in conjunction with the discussions of FIGS. 1-3 describe "zooming in" to view greater details of a supply chain. However, in conjunction with allowing a user to "zoom in" to display greater, more localized details of a supply chain, embodiments are also operative to "zoom out" to provide the user information that is applicable to larger geographical areas. For example, zooming out of a displayed supply chain may be initiated using a "zoom bar" or a "zoom meter," which is commonly a feature of third-party map providers.

Referring to FIG. 4, processing unit 405 is operable for providing an optional hypothetical-mode engine 419. Hypothetical-mode engine 419 allows a user to test the anticipated effects of a potential transfer of products from one entity to another before the actual transfer is initiated. The hypothetical effects are displayed for example, on output device 417 (FIG. 4), by temporarily updating various icons with colors or other indicators of the anticipated, hypothetical effects of the proposed transfer. For example, a user viewing second zoom level 200 (FIG. 2) on output device 417 may manipulate input device 407 to "drag and drop" inventory associated with supply parameter icon 217 to supply entity 101. In response, hypothetical-mode engine 419 generates potential effects of this transfer for display on output device 417. For example, if a transfer of goods from the supply entity associated with icon 111 (FIG. 2) to the supply entity associated with icon 101 (FIG. 2) results in adverse consequences to a retail outlet associated with icon 213 (FIG. 2), hypothetical-mode engine 419, initiates a display of the resulting adverse consequences. For example, the resulting adverse consequences, such as resulting low inventory levels, may be displayed in red. In response, the user may try another solution in the hypothetical-mode before deciding upon a final solution.

Still referring to FIG. 4, in alternate embodiments, hypothetical-mode engine 419 automatically generates solutions to supply chain issues and presents the solutions to a user for the user's approval. For example, hypothetical-mode engine 419 may automatically develop a logistical plan while attempting to minimize or maximize various optimization criteria. A user enters various constraints for the hypothetical-mode engine 419 to use or, alternatively, such constraints are stored in database 415, for example. The constraints may include maximum and minimum inventory amounts, transit times, parameters related to weather, or any other factors that may affect the movement of items in the supply chain. In some embodiments, once the user approves a solution provided by hypothetical-mode engine 419, business document generator 409 is triggered to result in the generation and sending of documents to inform relevant entities of the needed transfer of products.

As shown in FIG. 4, processing unit 405 is operable for executing a zoom engine 423. In some embodiments, zoom engine 423 is responsive to a user variably selecting a different geographical area for displaying. The geographical area may be larger or smaller than a currently displayed geographical area, so zoom engine 423 is capable of zooming in and zooming out. In selecting an area for zooming in, a user can provide directional input and selection input to input device 407 to define the region corresponding to selection box 117 (FIG. 1), for example.

Accordingly, while a first zoom level is displayed, a user may provide zoom engine 423 with selection input defining a second zoom level to display on an output device. For example, the selection input is provided by the user moving an input device, thereby triggering the movement of a cursor on the output device. The second zoom level corresponds to a second geographical area on the zoomable map image that may be smaller than a first physical region corresponding to the first zoom level. In some embodiments, the first zoom level provides a first amount of detail regarding one or more supply chain parameters related to a plurality of supply entities located within the first physical region. The second zoom level provides a second amount of detail regarding one or more of the supply chain parameters. In some embodiments, the second amount of detail is greater than the first amount of detail. In other words, at the second zoom level, embodiments provide information regarding supply chain parameters that is not supplied at the first zoom level. This allows a user to "drill-down" into details regarding a supply chain displayed on an output device. This results in the user, at each view, obtaining a manageable yet useful amount of detail regarding supply chain parameters.

In some embodiments, supply chain parameters shown at a first zoom level are not shown at a more-detailed, second zoom level. Further, embodiments are not necessarily restricted to any specific number of zoom levels, as larger or more elaborate supply chains may require many levels of zoom to provide the user with useful and manageable levels of detail at each zoom level. As a result, users of embodied systems are not inundated with information at any zoom level, and users can rapidly zoom in and out to survey various supply chain parameters across an entire supply chain.

Referring to FIG. 4, processing unit 405 optionally operates to provide an automatic inventory manager 425. In some embodiments, inventory manager 425 compares anticipated effects of one or more proposed inventory transfers to one or more threshold values. For example, if inventory manager 423 detects a problem with a proposed transfer, it warns the user that the proposed transfer violates a predetermined rule. Warnings may come in various forms, such as by inventory manager 423 initiating an audible warning or a flashing icon on output display 417. In this way, inventory manager 423 provides the user a warning displayed on the output device in response to comparing one or more anticipated effects to one or more threshold values.

Figure 5:
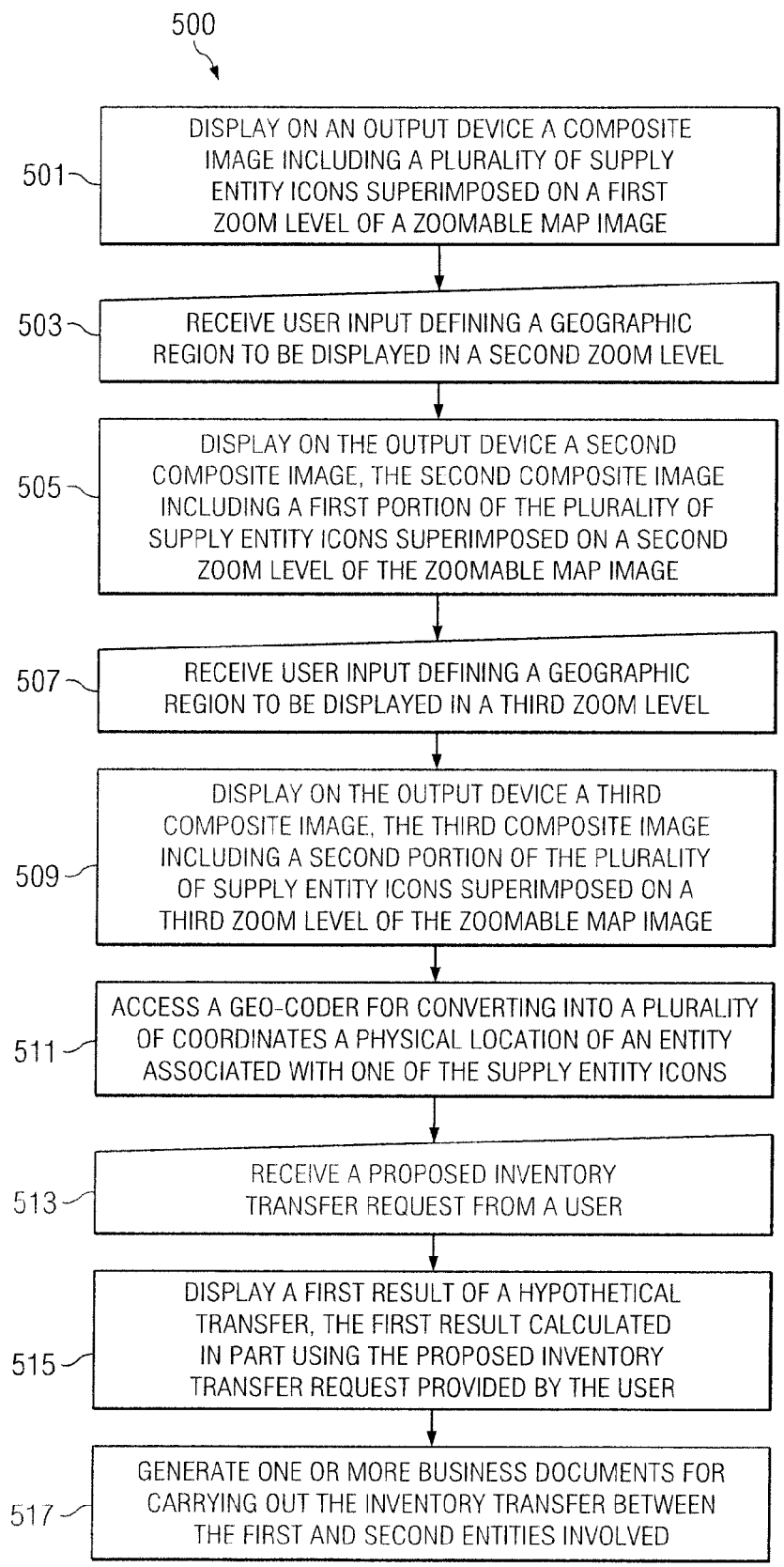
FIG. 5 illustrates functions for achieving supply chain visualization and management in accordance with some embodiments.

Illustrated in FIG. 5 are functions performed by process 500 for visualization and management of a supply chain. Function 501 includes displaying on an output device a composite image. The composite image includes a plurality of supply entity icons superimposed on a first zoom level of a zoomable map image. As illustrated in function 503, the user provides inputs to define a geographic region to be displayed at a second zoom level. In some embodiments, the user provides the input while an output display shows a first zoomable map image that represents a first geographical region in a supply chain. For example, in accordance with function 501, in FIG. 1 various supply entity icons are displayed at the first zoom level 100, which represents a geographical area bounded by the continental United States of America. In performing function 503 a user may drag and drop a mouse cursor displayed on output display 417 (FIG. 4) to define selection box 117.

Function 505 relates to the display of a second composite image on the output device. The second composite image includes a first portion of supply entity icons displayed in function 501. The first portion of the plurality of supply entity icons is superimposed on a second zoom level of the zoomable map image. The data processing system depicted in FIG. 4 may be used to perform function 505. Specifically, output device 417 (FIG. 4) displays a second composite image including a portion of supply entity icons displayed in function 501, superimposed on a second zoom level, for example second zoom level 200 (FIG. 2).

As illustrated in FIG. 2, in some aspects, second zoom level 200 is a more detailed view of the geographical region bounded by selection box 117 (FIG. 1). For example, second zoom level 200 includes supply parameter icon 217 which is associated with supply entity icon 111. Further, second zoom level 200 includes icon 211 and icon 209, which in an embodiment, represent a warehouse and a retail outlet, respectively. Further, zoom level 200 includes various connector icons, for example connector icon 227 and connector icon 203, which includes a graphical indication as to whether the supply route associated with the connector icon is disrupted.

As another aspect of process 500, function 507 includes the user providing input to define a geographic region to be displayed at a third zoom level. For example, while output display 417 (FIG. 4) displays second zoom level 200 (FIG. 2), the user drags and drops a cursor using input device 407 to define a second selection box 231 (FIG. 2). As illustrated in FIG. 2, selection box 231 defines a third geographic region to be displayed at a third zoom level.

In function 509, an output device displays a third composite image. The third composite image includes a second portion of the plurality of supply entity icons. In the third composite image, the second portion of the plurality of supply entity icons are superimposed on a third zoom level of a zoomable map image. For example, in FIG. 3, zoom level 300 represents a third composite image on a zoomable map image with supply entity icons superimposed thereupon. In an embodiment, the bounds of the third composite image correspond to a geographic region defined by selection box 231 (FIG. 2). As shown in FIG. 3, a portion of the plurality of supply entity icons from FIG. 2 are also superimposed on the third zoom level 300. For example, retail outlet 215 is superimposed on zoom level 300.

As a next optional aspect, process 500 includes function 511 for accessing a geo-coder for converting into a plurality of coordinates a physical location of an entity associated with one or more supply entity icons. For example, if the provider of a zoomable map image, for example Yahoo Maps or Google Maps, requires latitude and longitude coordinates for locating retail outlet 215 (FIG. 2) on third zoom level 300 (FIG. 3), a geo-coder may be accessed to convert a known address for retail outlet 215 into coordinates usable by the provider of the zoomable map image.

As yet another optional aspect to process 500, function 513 includes receiving a proposed inventory transfer request from a user. For example, a user of computer 401 (FIG. 4) provides directional inputs to user input device 407 to drag-and-drop inventory from one supply entity icon to another supply entity icon while each of the supply entity icons are displayed on output device 417.

In another optional aspect, function 515 includes displaying a first result of a hypothetical transfer request on an output device, for example output device 417 (FIG. 4). The first result is calculated in part using the proposed inventory transfer request provided by the user in function 513. The display of the first result of a hypothetical transfer includes providing any adverse effects anticipated by a transfer request.

In some embodiments, process 500 includes function 517 for generating one or more business documents for sending to all entities involved in a transfer. For example, business documents are generated and sent to both the supplier and the receiver of inventory which is the subject of an inventory transfer request. Alternatively, a supply transfer request results in the generation of business documents to several potential suppliers and one potential recipient, and the several potential suppliers either bid on transferring supplies to the recipient, or otherwise provide feedback regarding their ability to transfer the needed inventory. In this way, the generation of business documents provides the user with the real-time ability to transfer inventories as needed.

In accordance with some embodiments of the present disclosure, the methods and systems described herein may be implemented by software programs executable by a computer system. Further, in an exemplary, non-limited embodiment, implementations can include distributed processing, component/object distributed processing, parallel processing, and geographically distributed systems connected with the Internet protocols such as TCP/IP, HTTP, UDP, and the like. Alternatively, virtual computer system processing can be constructed to implement one or more of the methods or functionality as described herein.

Figure 6:
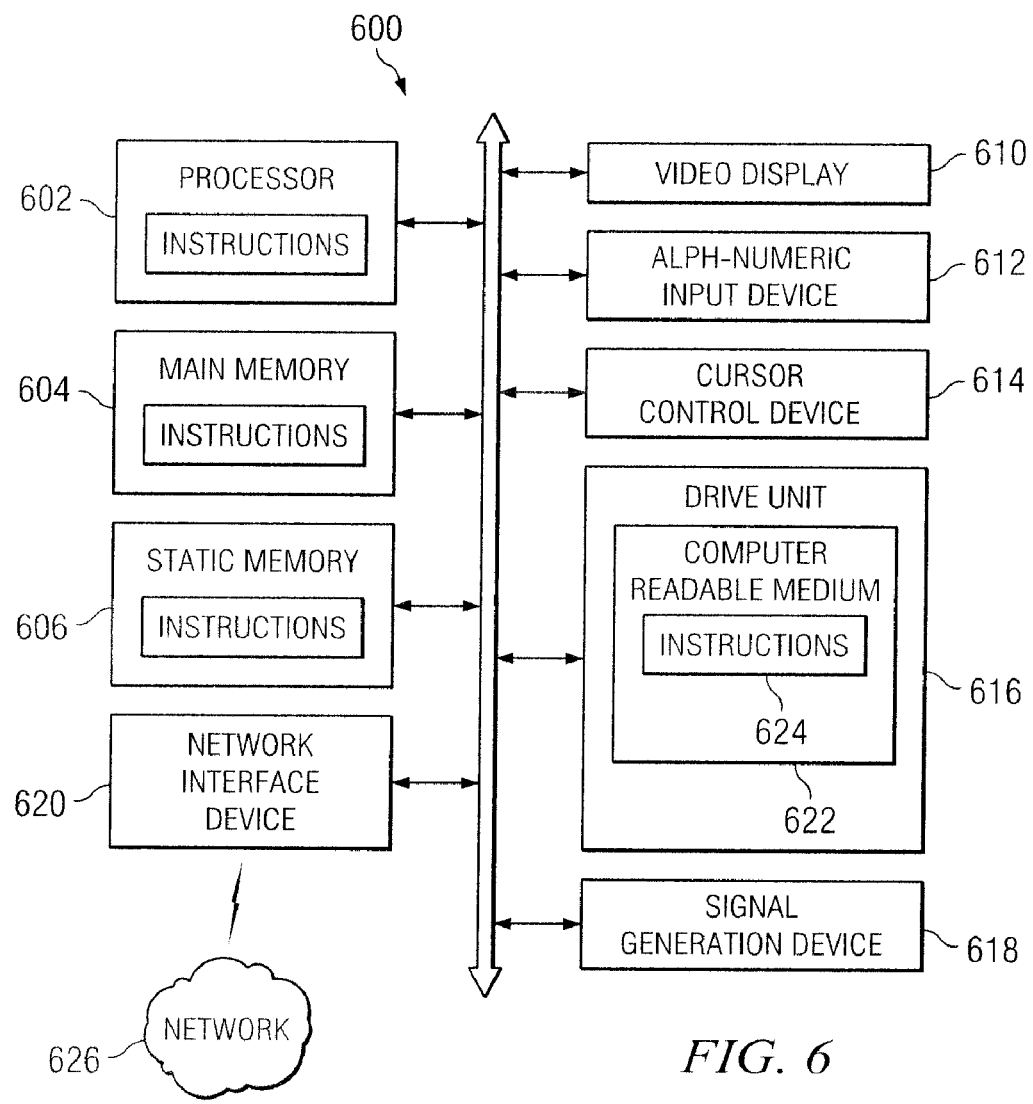
FIG. 6 is a block diagram of an illustrative embodiment of a general computer system.

Referring to FIG. 6, an illustrative embodiment of a general computer system 600 is shown. The computer system 600 can include a set of instructions that can be executed to cause the computer system 600 to perform any one or more of the methods or computer based functions disclosed herein. The computer system 600 may embody computer 401 or computer 403 (FIG. 4), for example. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized.

Accordingly, the above disclosed subject matter is to be considered illustrative, and not restrictive, and the appended claims are intended to cover all such modifications, enhancements, and other embodiments which fall within the true spirit and scope of the present invention. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into this detailed Description, with each claim standing on its own as defining separately claimed subject matter.

What is claimed is:

1. A system for visualization and management of a supply-chain, the system comprising:
    a first supply chain image superimposed on a computer-related zoomable map image, the first supply chain image representing the supply chain at a first zoom level, the first zoom level representing a first geographical region, the first supply chain image including:
        a connector icon positioned between a first supply entity icon and a second supply entity icon, the connector icon representing a route for product flow between a first supply entity and a second supply entity, the first supply entity and the second supply entity located within the first geographic region;
    an input device for selecting a second zoom level of the computer-related zoomable map image, a second supply chain image superimposed on the second zoom level, the second zoom level representing a second geographical region within the first geographical region, the second supply chain image including:
        a first supply parameter icon relating to the first supply entity;
        a second supply parameter icon relating to the second supply entity;
        a first graphical supply indicator corresponding to a first supply quantity of the first supply entity;
    a second graphical supply indicator corresponding to a second supply quantity of the second supply entity;
    a plurality of inventory icons visible at a third zoom level, the third zoom level activated in response to a user input, each of the plurality of inventory icons including a non-textual representation of a product inventory level; and
    a business document generator for generating a first business document, the business document generator responsive to a user manipulating a first of the plurality of inventory icons to symbolically transfer a product from a first warehouse to a second warehouse, the business document generator for sending the first business document to the first warehouse, the business document generator for sending the first business document to the second warehouse, the first business document instructing the first warehouse to send the product to the second warehouse.

2. The system of claim 1, wherein a first supply parameter corresponds to the first supply parameter icon, wherein a second supply parameter corresponds to the second supply parameter icons, the system further comprising:
    a hypothetical mode responsive to a user initiating a proposed product transfer, the hypothetical mode for estimating the first supply parameter resulting from the proposed product transfer, the hypothetical mode for estimating the second supply parameter resulting from the proposed product transfer, the estimated first supply parameter and the estimated second supply parameter superimposed on the computer-related zoomable map image.

3. The system of claim 2, wherein the user initiates the proposed product transfer by dragging a first icon and dropping it on a second icon, the first icon corresponding to a product located in the first supply entity, the second icon corresponding to the second supply entity.

4. The system. of claim 2, further comprising:
    an address manager, the address manager for accessing a geo-coder for determining:
        a first longitude and a first latitude from a first address of the first supply entity;
        a second longitude and a second latitude from a second address of the second supply entity;
    an icon manager, the icon manager responsive to the first longitude and the first latitude for displaying the first supply entity icon, the icon manager responsive to the second longitude and the second latitude for displaying the second supply entity icon.

5. The system of claim 1, wherein the connector icon includes a graphical indication of an interruption in the route for product flow.

6. The system of claim 1, further comprising:
an automatic inventory manager, the automatic inventory manager for prompting the user with a warning, the warning responsive to the automatic inventory manager determining that to transfer the product from the first warehouse to the second warehouse would violate a predetermined rule.

7. The system of claim 6, wherein the computer-related zoomable map image includes a satellite photograph.

8. The system of claim 1, further comprising:
a third graphical supply indicator for displaying a percentage of a first storage space that is occupied, the first storage space belonging to the first supply entity; and
a fourth graphical supply indicator for displaying a second percentage of a second storage space that is occupied, the second storage space belonging to the second supply entity.

9. The system of claim 8, further comprising:
a first category icon, the first category icon associated with the first graphical supply indicator, the first category icon providing a first indicator regarding a first amount of a first portion of the first supply quantity;
a second category icon, the second category icon providing a second indicator regarding a second amount of a second portion of the first supply quantity.

10. A method for visualization and managing a supply-chain, the method comprising:
displaying on an output device a first composite image, the first composite image including a plurality of supply entity icons superimposed on a first zoom level of a zoomable map image, the first composite image corresponding to a first geographical region; and
displaying on the output device a second composite image, the second composite image including a first portion of the plurality of supply entity icons superimposed on a second zoom level of the zoomable map image, the second composite image corresponding to a second geographical region, the second geographical region encompassed by the first geographical region, the second zoom level defined by first user inputs received from the user during display of the first composite image, the second composite image including a first plurality of supply parameter icons, a portion of the first plurality of supply parameter icons related to one or more of a first plurality of physical supply entities corresponding to the first portion of the plurality of supply entity icons;
displaying on the output device a third composite image, the third composite image including a second portion of the plurality of supply entity icons superimposed on a third zoom level of the zoomable map image, the third composite image corresponding to a third geographical region, the third geographical region encompassed by the second geographical region, the third zoom level defined by second user inputs received from the user during display of the second composite image, the third composite image including a second plurality of supply parameter icons, a portion of the second plurality of supply parameter icons related to one or more of a second plurality of physical supply entities, the second plurality of physical supply entities not corresponding to the plurality of supply entity icons superimposed on the first zoom level; and
generating, with a business document generator, a business document, the business document generator responsive to a user manipulating a portion of the first plurality of supply parameter icons to symbolically transfer a product from a first product warehouse to a second product warehouse, the business document generator for initiating sending the first business document to the second product warehouse, the first business document instructing the first product warehouse to send the product to the second product warehouse.

11. The method of claim 10, further comprising:
displaying a first result of a hypothetical transfer, the first result calculated using a proposed inventory transfer request provided by the user.

12. The method of claim 11, further comprising:
accessing a geo-coder for converting into a plurality of coordinates a physical location of an entity associated with one of the supply entity icons, the physical location accessed from a database, the plurality of coordinates having a longitude and a latitude.

13. The method of claim 12, further comprising:
displaying on the output device a warning, the warning in response to an inventory manager comparing one or more anticipated effects of the proposed inventory transfer request to one or more threshold values.

14. A computer-readable storage medium having computer-readable program code for visualizing and managing a supply-chain, the code comprising code for:
displaying a first composite image, the first composite image including a plurality of supply entity icons superimposed on a first zoom level of a zoomable map image, the first composite image corresponding to a first geographical region; and
displaying a second composite image, the second composite image including a first portion of the plurality of supply entity icons superimposed on a second zoom level of the zoomable map image, the second, composite image corresponding to a second geographical region, the second geographical region encompassed by the first geographical region, the second zoom level defined by first user inputs received from the user during display of the first composite image, the second composite image including a first plurality of supply parameter icons, a portion of the first plurality of supply parameter icons related to one or more of a first plurality of physical supply entities corresponding to the first portion of the plurality of supply entity icons;
displaying a third composite image, the third composite image including a second portion of the plurality of supply entity icons superimposed on a third zoom level of the zoomable map image, the third composite image corresponding to a third geographical region, the third geographical region encompassed by the second geographical region, the third zoom level defined by second user inputs received from the user during display of the second composite image, the third composite image including a second plurality of supply parameter icons, a portion of the second plurality of supply parameter icons related to one or more of a second plurality of physical supply entities, the second plurality of physical supply entities not corresponding to the plurality of supply entity icons superimposed on the first zoom level; and
generating a business document responsive to a user manipulating a portion of the first plurality of supply parameter icons to symbolically transfer a product from a first product warehouse to a second product warehouse and initiating sending of the first business document to the second product warehouse, the first business document instructing the first product warehouse to send the product to the second product warehouse.

* * * * *